United States Patent [19]

Katori et al.

[11] Patent Number: 4,839,797

[45] Date of Patent: Jun. 13, 1989

[54] MICROPROCESSOR COMPATIBLE WITH ANY SOFTWARE REPRESENTED BY DIFFERENT TYPES OF INSTRUCTION FORMATS

[75] Inventors: Shigetatsu Katori; Yukio Maehashi, both of Tokyo, Japan

[73] Assignee: NEC Corporation, Tokyo, Japan

[21] Appl. No.: 759,006

[22] Filed: Jul. 25, 1985

[30] Foreign Application Priority Data

Jul. 25, 1984 [JP] Japan ............... 59-154824

[51] Int. Cl.⁴ .............................................. G06F 1/00
[52] U.S. Cl. ................... 364/200; 364/244.6; 364/247.6; 364/259.9; 364/262.81
[58] Field of Search ... 364/200 MS File, 900 MS File

[56] References Cited

U.S. PATENT DOCUMENTS

| 4,315,321 | 2/1982 | Parks, III et al. ............ | 364/900 |
| 4,388,682 | 6/1983 | Eldridge ....................... | 364/200 |
| 4,415,969 | 11/1983 | Bayliss et al. ............... | 364/200 |
| 4,638,423 | 1/1987 | Ballard ......................... | 364/200 |

Primary Examiner—Gareth D. Shaw
Assistant Examiner—Rebecca L. Rudolph
Attorney, Agent, or Firm—Sughrue, Mion, Zinn, Macpeak & Seas

[57] ABSTRACT

A microprocessor includes a central processing unit which executes a program according to at least one control signal generated by an instruction decoder. The instruction decoder is designed such that a first type instruction compatible for the central processing unit can be decoded. A second type instruction not compatible for the central processing unit is applied as an address to a conversion memory in which a first type instruction corresponding in function to the second type instruction has been stored. The first type instruction in the conversion memory is then applied to the instruction decoder instead of the second type instruction. Thus, the second type instruction can be executed by the central processing unit which is not otherwise compatible with the second type instruction.

10 Claims, 4 Drawing Sheets

MICROPROCESSOR COMPATIBLE WITH ANY SOFTWARE REPRESENTED BY DIFFERENT TYPES OF INSTRUCTION FORMATS

BACKGROUND OF THE INVENTION

1. Field of the Invention

The present invention relates to a microprocessor including an instruction decoder for decoding instructions to be executed, and more particularly to a microprocessor compatible with software represented by different types of instruction formats.

In conformity with the rapid progress of LSI techniques, the efficiency of microprocessors (or microcomputers) has remarkably improved. Recently, microprocessors with high performance have been offered at low cost. Further, in response to urgent requirements, new types of microprocessors implementing architectures designed on the basis of the latest LSI technology have been developed and have been widely used in many industrial fields. Therefore, development of software for a newly designed microprocessor is often required in a short period of time.

On the other hand, considering the hardware architecture of a microprocessor, 16-bit or 32-bit parallel processing types of microprocessors have been developed. A large amount of software developed for 8-bit parallel processing type of microprocessors cannot be directly adapted to the 16-bit or 32-bit parallel processing type microprocessor (hereinafter, referred to as 16-bit or 32-bit microprocessor). Therefore, new software or modified software is required for the 16-bit or 32-bit microprocessor. It is, however, impossible to quickly develop new software or modify the existing software, because of necessities of a long period a complex handwork and a high cost.

To avoid this problem, an 8-bit microprocessor has been incorporated into a conventional 16-bit microprocessor system so that both the 16-bit microprocessor and the 8-bit microprocessor are independently installed and employed in the system. In the operation of this system, when the software for the 16-bit microprocessor is to be executed, the 8-bit microprocessor is decoupled from a data bus add an address bus to which a memory is coupled. On the other hand, when the 8-bit microprocessor is to be used, the 16-bit processor is decoupled from the system data bus and the system address bus. This decoupling operation is performed by an interface device inserted between the system buses and the 8-bit and 16-bit microprocessors.

According to this system, two microprocessors are independently required. In other words, two control processing units and two instruction decoders are required. Further, the interface device for controlling the bus connection is required. Therefore, the system has a disadvantage that its size becomes very large. Furthermore, the system cost is increased due to the many hardware elements. Moreover, in the system operation, the instruction decoder and the control processing unit (CPU) of the 8-bit microprocessor cannot be used when an instruction of the 16-bit microprocessor is executed, and vice versa.

SUMMARY OF THE INVENTION

An object of the present invention is to provide a microprocessor having a common hardware resource for different types of software, represented by different instruction formats.

Another object of the present invention is to provide a microprocessor compatible with two different types of software (e.g., software for an 8-bit microprocessor and software for a 16-bit microprocessor).

Still another object of the present invention is to provide a microprocessor capable of running the existing software without rewriting or modifying the existing software.

Still another object of the present invention is to provide a microprocessor in which a simple hardware circuit executing different types of instructions is formed on a single semiconductor chip.

A microprocessor of the present invention includes a central processing unit, an instruction decoder and a conversion memory. The instruction decoder has a decoding function such that a plurality of control signals are generated on the basis of instructions to be executed by the central processing unit. The conversion memory stores a plurality of instructions which can be executed by the central processing unit.

According to the microprocessor of the present invention an instruction which can be directly executed by the central processing unit is applied to the instruction decoder while an instruction which cannot be executed by the central processing unit as is applied as an address to the conversion memory. In response thereto, the instruction stored in the conversion memory is read out from the address designated by the instruction which cannot be directly executed by the central processing unit 5 and is applied to the instruction decoder. Namely, the instruction which cannot be directly executed by the central processing unit is converted into the instruction which is not compatible with the central processing unit by means of the conversion memory. Therefore, if the instruction of a type which is not compatible with the central processing unit is applied to the microprocessor, it is automatically changed to the instruction of a type which is compatible with the central processing unit, and is thereafter transferred to the instruction decoder. Thus, a single central processing unit and a single instruction decoder can be commonly used for two types of instructions. Further, the interface device for controlling the bus connection can be omitted from the microprocessor of the present invention. In other words, two types of instructions can be performed without changing the bus connection.

For switching the instructions to be applied to the instruction decoder, the microprocessor of the present invention includes means for detecting the types of the instructions and means responsive to the detecting means for selectively applying either the instructions from the system data bus or the instruction from the conversion memory to the instruction decoder.

In the microprocessor of the present invention, a table-look-aside memory, a table reference memory or the like can be used as the conversion memory Further by providing an address controller described hereinafter, a variety of instruction conversion can be performed.

DESCRIPTION OF THE PRIOR ART

A conventional microprocessor system capable of performing a first type software for a 16-bit microprocessor and a second type software for a 8-bit microprocessor will first be described with reference to FIG. 1. A 16-bit microprocessor 1-1 and an 8-bit microprocessor 1-2 are independently employed and are coupled to a system data bus 1-4 and a system address bus 1-5 via an emulation control circuit (an interface device) 1-3. A memory 1-6 including the first type f software and the second type of software is coupled to the system data bus 1-4 and the system address bus 1-5 to which an external input-output device 1-7 is also coupled. Hereinafter, a mode in which the first type software is executed will be referred to as a native mode, while a mode in which the second type software is executed will be referred to as an emulation mode. The first type of software is represented by instruction codes which can be directly executed by the 16-bit microprocessor. In contrast, the second type of software is represented by instruction codes which can be directly executed by the 8-bit microprocessor.

Now, when the system executes a program in the native mode the 16-bit microprocessor is coupled to the system data bus 1-4 and the system address bus 1-5 under the control of the emulation control circuit 1-3. In this case, the 8-bit microprocessor 1-2 is decoupled from the system buses 1-4 and 1-5. The 16-bit microprocessor 1-1 performs the first type of software readout of the memory 1-6. On the other hand when the second type of software is to be executed the emulation control circuit 1-3 electrically cuts off the 16-bit microprocessor from the system buses 1-4 and 1-5, and couples the 8-bit microprocessor to the system buses. The emulation control circuit 1-3 thus acts as a multiplexer according to the selected mode.

As described above, the 16-bit microprocessor 1-1 can execute the first type of software but cannot execute the second type of software, while the 8-bit microprocessor 1-2 can execute the second type of software but cannot execute the first type of software. In other words, instructions of the first type of software can be decoded by an instruction decoder included only in the 16-bit microprocessor 1-1, while instructions of the second type of software can be decoded by an instruction decoder included only in the 8-bit microprocessor. Therefore both microprocessors 1-1 and 1-2 are independently required to perform the first and second types of software.

Further, these two microprocessors must be used exclusively. Particularly. if the two types of software are alternatively performed, many bus changing operations are required.

Thus. the conventional microprocessor is large and expensive. Further it is inadequate for a system in which different types of instructions are manipulated, i.e., different types of instructions where the functions are the same but instruction code patterns are different from each other.

DETAILED DESCRIPTION OF AN EMBODIMENT OF THE PRESENT INVENTION

Figure 2:
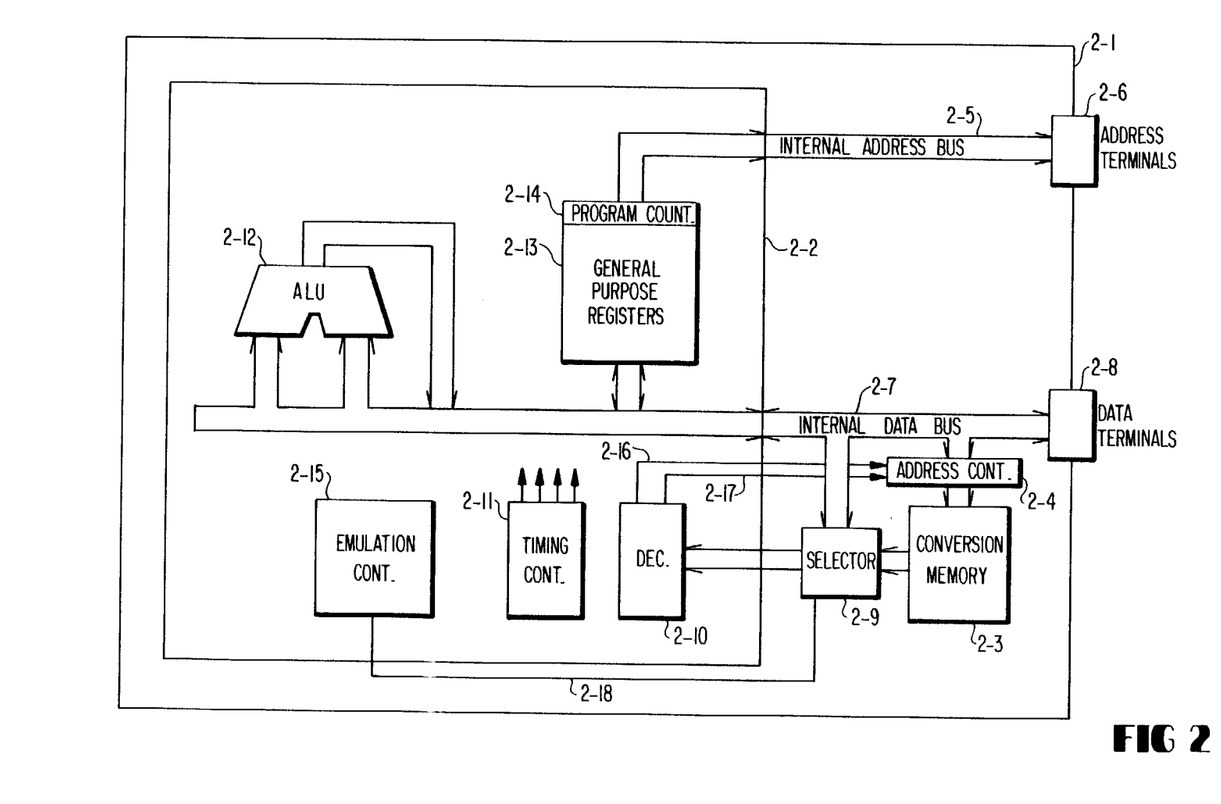
FIG. 2 is a block diagram of a microprocessor according to one embodiment of the present invention.

FIG. 2 shows a block diagram of an embodiment of the present invention. A microprocessor 2-1 has a central processing unit (CPU) 2-2. a conversion memory 2-3, an address control circuit 2-4 and an instruction selector 2-9, all of which are integrated on a single semiconductor chip. The CPU 2-2 includes an instruction decoder 2-10, a timing control circuit 2-11, an arithmetic logic unit (ALU) 2-12 a plurality of general purpose registers 2-13, a program counter 2-14 and an emulation control circuit 2-15. The CPU 2-2 is so designed that for example. instructions for the 16-bit microprocessor are directly executed. That is, the instruction decoder 2-10 may be the same decoder as that of the conventional 16-bit microprocessor except for one function described hereinafter. The timing control circuit 2-11 the ALU 2-12 the general purpose registers 2-13 and the program counter 2-14 may be also the same circuits as those of the conventional 16-bit microprocessor. Operations of those circuits are substantially the same operations as in the conventional 6-bit microprocessor and therefore the detailed description of their operation is omitted herein.

The program counter 2-14 is coupled to address bus terminal 2-6 via an internal address bus 2-5 and generates addresses for accessing at least one external memory. The ALU 2-12 and the general purpose registers 2-13 are coupled to data bus terminal 2-8 via an internal data bus 2-7 through which instructions and data are transferred. The address bus terminals 2-6 and the data bus terminals 2-8 are coupled to a system address bus and a system data bus (not shown), respectively to which at least one instruction memory (not shown) storing both the first type of software and the second type of software is coupled outside the microprocessor 2-1. However, the instruction memory may be incorporated on the chip of the microprocessor.

The program counter 2-14 is incremented by +1 whenever an instruction is executed by the CPU 2-2. If a jump instruction a branch instruction or the like is executed, a jump address or a branch address is set in the program counter 2-14. The content of the program counter 2-14 is transferred to the memory coupled to the system address bus via the address bus terminals 2-6, and an instruction accessed by the content of the program counter 2-14 is then transferred to the internal data bus 2-7 via the data terminals 2-8.

Now, if the first type of software which can be executed by the CPU 2-2 is accessed. the instruction on the internal data bus is applied to the instruction decoder, as is, through the instruction code selector 2-9 which is controlled by the emulation control circuit 2-15 such that the internal data bus 2-7 is coupled to the instruction decoder 2-10. Thus, the instruction of the first type of software is directly inputted to the instruction decoder 2-10 and is decoded and the CPU 2-2 executes a program according to the results of decoding. This mode is the native mode.

On the other hand, when the emulation mode is required the emulation control circuit 2-15 applies a control signal indicating the emulation mode to the instruction code selector 2-9 through a control signal line 2-18. The instruction code selector 2-9 cuts off the internal data bus 2-7 from the instruction decoder 2-10 and instead couples the output of the conversion memory 2-3 to the instruction decoder 2-10. In the emulation mode an instruction accessed by the content of the program counter 2-14 is one of the second type of software which cannot be executed by the CPU 2-2. That is, the instructions to be executed in the emulation mode are those which are executed by the 8-bit microprocessor but cannot be executed by the 16-bit microprocessor. In the present invention. the instruction of the second type of software is applied to the conversion memory 2-3 as an address. At the location designated by the instruction on the internal data bus 2-7, the instruction which can be directly executed by the CPU 2-2 is preliminarily stored. This instruction is one of the first type of software and has the same function as that of the instruction of the second type of software. That is, an instruction of the second type of software is converted into an instruction of the first type of software and is applied to the instruction decoder 2-10. Therefore, even if the second type of software is accessed by the microprocessor 2-1, the CPU 2-2 can execute the operation exactly. As the result the CPU of the 16-bit microprocessor and the instruction decoder of the 16-bit microprocessor can execute the second type of software (for the 8-bit microprocessor) as well as the first type of software.

According to the present invention a rewriting or modification of the software is not required. Further, the CPU and the instruction decoder of the 16-bit microprocessor can be used not only for the first type of software but also for the second type of software Therefore. the size and cost of the microprocessor can be significantly reduced.

In the above embodiment the relationship of the first type of software and the second type of software is preliminarily recognized by a user or a manufacturing maker. Therefore, the table to be stored in the conversion memory 2-03 is determined beforehand. For this reason, a mask ROM, a programmable ROM, a RAM, or the like can be used as the conversion memory. For example, an ROM included in a single chip microcomputer may be used as the conversion memory. Further, each of instructions of the second type of software is used to address a respective location of the conversion memory, and the instruction of the first type of software corresponding to that of the second type of software is stored at the address location designated by the instruction of the second type of software.

Since the emulation control circuit 2-15 is used to indicate the selecting operation of the selector 2-9, the emulation control circuit 2-15 may be constructed by a well known flip-flop circuit in which a first signal level is set when the native mode is required, while a second signal level is set when the emulation mode is required. Moreover. the emulation control circuit 2-15 need not be located inside the CPU 2-2.

If the number of byte(s) of an instruction of the second type of software is equal to that of the corresponding instruction of the first type of software, the instruction of the second type of software can be directly applied to the conversion memory 2-3. However, when the essential instruction format e.g., the number of bytes' of the first type of software is different from that of the second type of software. direct access by the instruction of the second type of software is difficult because of a difference of the number of bytes. Here, one byte means a part of an instruction which can be accessed by one address.

Figure 1:
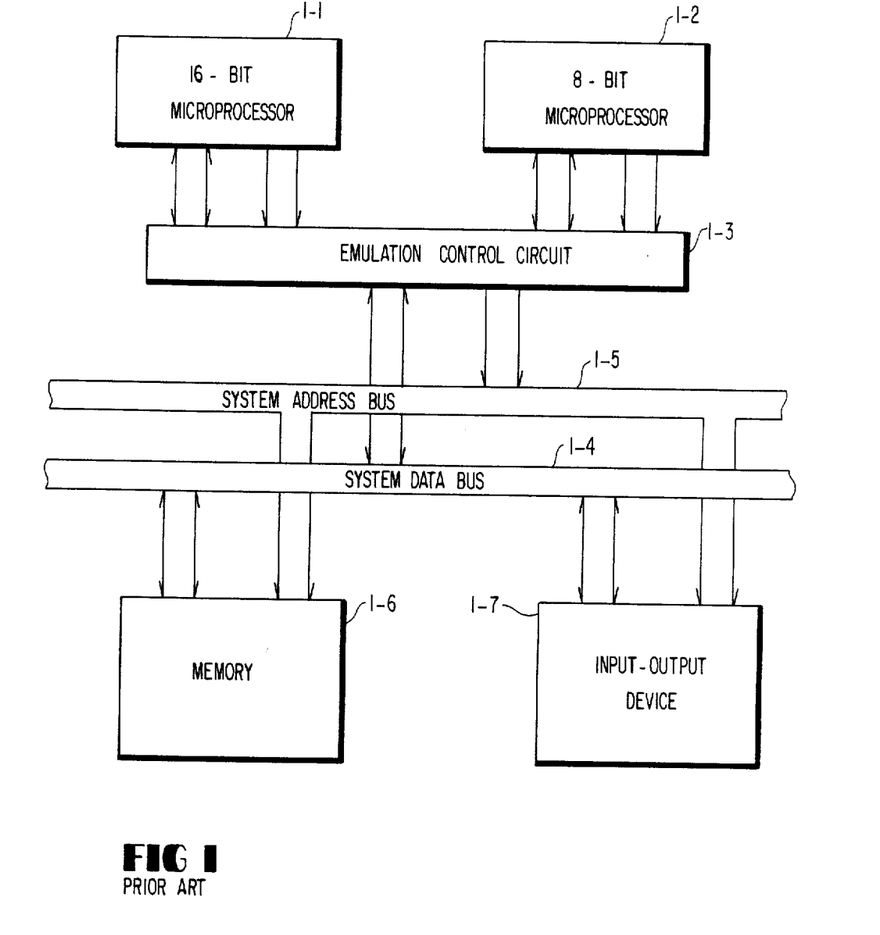
FIG. 1 a system block diagram of a conventional microprocessor system employing 8-bit microprocessor and 16-bit microprocessors.
Figure 3:
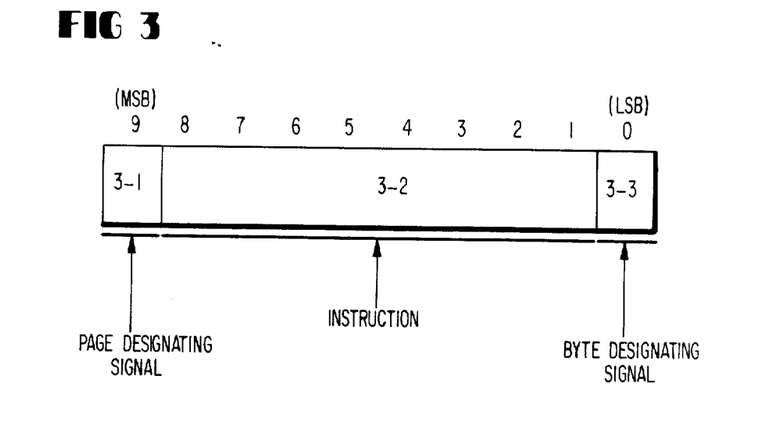
FIG. 3 is an address form diagram of an address controller employed in the microprocessor as shown in FIG. 2.

To solve this problem, an address control circuit 2-4 is provided in the embodiment shown in FIG. 1. The address control circuit 2-4 includes a register or a latch circuit with at least three fields. If a byte of an instruction of the second type of software consists of 8-bits, the register structure of the address control circuit 2-4 is shown in FIG. 3. In FIG. 3. the register has a first field 3-1 (bit 9), a second field 3-2 (bits 1 to 8) and a third field (bit 0). The first field 3-1 whose input end receives a first signal 2-17 generated from the instruction decoder 2-10 is used to output a page designating signal. The second field 3-2 is coupled to the internal data bus 2-7 and receives an instruction of 8-bits transferred from the external memory storing the second type of software. The instruction set in the second field 3-2 is directly outputted from its output end without modification The third field 3-3 receives a second signal 2-16 from the instruction decoder 2-10 and outputs a byte designating signal. In this embodiment, the first signal 2-17 is used as the page designating signal and is set in the MSB (most significant bit) of the register, while the second signal 2-16 is used as the byte designating signal and is set in the LSB (least significant bit) of the register.

Figure 4A:
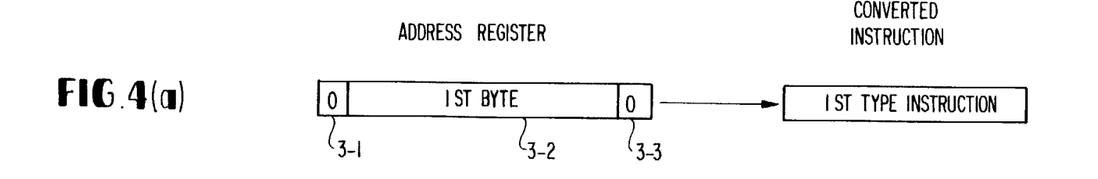
FIGS. 4(a), 4(b) and 4(c) illustrate instruction conversion of the microprocessor shown in FIG. 2.
Figure 4B:
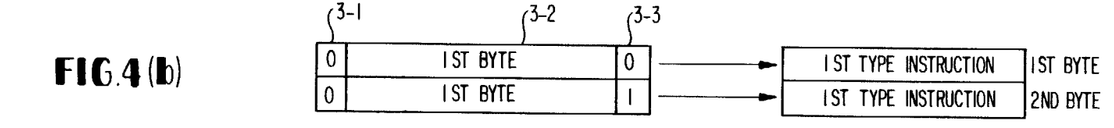
Figure 4C:
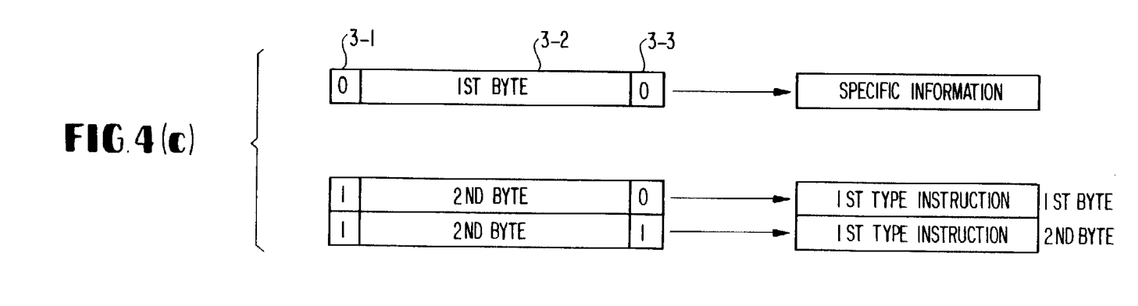

Next, the principle of the emulation mode will be described with reference to FIG. 4. As mentioned above in the emulation mode. an instruction received in the microprocessor 2-1 cannot be directly executed because of a different instruction format from that of the microprocessor 2-1. Thus, if the instruction is executed without any conversion, meaningless processing is carried out and the program will not run properly. The present invention employs the conversion memory 2-3 and the address control circuit 2-4 so that the instruction for an 8-bit microprocessor is translated (interpreted) by means of the conversion memory 2-3 and then transferred to the instruction decoder 2-10.

However, the correspondence between instructions of the first type of software and instructions of the second type software is very complicated. For example, identical instructions, such as a transfer instruction or an arithmetic instruction, are used in general in many microprocessors, but their code patterns are different from each other. Therefore various cases must be considered. A first case is where a certain operation is assigned by a 1-byte instruction in the second type of software and the same operation is assigned by another 1-byte instruction in the first type of software. A second case is where the operation assigned by 1-byte instruction in the second type software is assigned by 2-byte instruction in the fist type of software (hereinafter, referred to as a second case, the case that the operation assigned by a 2-byte instruction in the second type of software is assigned by a 2-byte instruction in the first type of software.

The first case will be described with reference to FIG. 4(a). According to an address from the program counter 2-14, a 1-byte instruction is inputted to the internal data bus 2-7 through the data bus terminals 2-8. This 1-byte instruction consisting of 8-bits is set in the second field 3-2 of the register of the address control circuit 2-4. At this time, the page designating signal 2-17 and the byte designating signal 2-16 are both absent, so that the MSB (1st field 3-1) and the LSB (3rd field 3-3) over "0". If the content of the second field 3-2 is 10000001, the content of the register is 0100000010. Therefore, 0100000010 is applied to the conversion memory 2-3 as the address. The instruction of the first type of software corresponding to the instruction set in the second field 3-2 has been previously stored at the address (0100000010) of the conversion memory 2-3. Thus the converted instruction is read out of the conversion memory 2-3 and is applied to the instruction decoder 2-10 through the instruction selector 2-9. The CPU 2-2 executes the instruction according to the results of the decoding operation and advances the content of the program counter 2-14 to access the next instruction of the second type of software.

The second case will now be described with reference to FIG. 4(b). In this case, an instruction of the second type of software to be executed consists of a single byte (1-byte instruction). so that only a single byte instruction is received into the microprocessor 2-1. This single byte instruction is set in the second field 3-2 as in the first case. At this time, since the page designating signal 2-17 and the byte designating signal 2-16 are both absent, "0" is set in the first and third fields 3-1 and 3-3 of the register. If, therefore the code of the single byte instruction set in the second field 3-2 is 11101111, the address to be applied to the conversion memory 2-3 is 0111011110. In this embodiment a first byte of the instruction of the first type of software corresponding to the single byte instruction received in the microprocessor 2-1 has been previously stored at the address (0111011110) of the conversion memory 2-3. Therefore the first byte is transferred to the instruction decoder 2-10 through the selector 2-9 and is decoded. As a result of the decoding, the byte designating signal 2-16 is generated. To allow this decoding, an information indicating that the instruction to be executed consists of two bytes is included in the first byte. This technique is known in the art, that is in a microprocessor manipulating an instruction consisting of an plurality of bytes.

According to the byte designating signal 2-16, "1" is set in the third field 3-3 of the register. Therefore the address to be applied to the conversion memory 2-3 at the next timing is modified to 0111011111 at which a second byte of the instruction of the first type software to be executed has been stored. Thus, the second byte is successively read out of the conversion memory 2-3.

Next, the third case will be described with reference to FIG. 4(c). In this case, a first byte of an instruction of the second type of software is firstly received in the microprocessor 2-1 and is set in the second field 3-2. At this time the page designating signal 2-17 and the byte designating signal 2-16 are both absent, and therefore the MSB (1st field 3-1) and the LSB (3rd field 3-3) are each "0". Now, when the first byte set in the second field 3-2 is 10101011, an address applied to the conversion memory 2-3 is 0101010110. In this case. a specific code is preliminarily stored at the location corresponding to the address (0101010110). The specific code includes the information indicating that the current instruction of the second type of software is a 2-byte instruction. This specific code is read out of the conversion memory 2-3 and is applied to the instruction decoder 2-10. The instruction decoder 2-10 decodes the specific code and generates the page designating signal 2-17 and an increment signal for incrementing a content of the program counter 2-14 by +1. The page designating signal 2-17 may be used as the increment signal. As the result, an address advanced by +1 is outputted from the microprocessor 2-1 and is applied to the external memory storing the 2-byte instruction in the second type of software. Thus, the second byte of the instruction to be executed is read out of the external memory and is transferred to the internal data bus 2-7. This second byte is set in the second field 3-2. At this time. "1" is set in the first field 3-1 by the page designating signal 2-17. Therefore, if the second byte set in the second field 3-2 is 11101111 a content of the register is 1111011110. Thus, the conversion memory 2-3 is accessed by the address 1111011110 corresponding to a location where a first byte of the first type of software corresponding to the instruction of the second type of software to be executed has been stored. The first byte read out of the conversion memory 2-3 includes an information indicating that a second byte subsequent to the read-out first byte is to be read out of the conversion memory 2-3 successively. Therefore, the instruction decoder 2-10 generates the byte designating signal 2-16 by decoding the read-out first byte. As a result, the content of the register in the address control circuit 2-4 becomes 1111011111. Accordingly, at the subsequent timing, the second byte preliminarily stored at the address 1111011111 is read out of the conversion memory 2-3 and is transferred to the instruction decoder 2-10 through the instruction selector 2-9. Thus, the 2-byte instruction of the first type of software can be read out of the conversion memory 2-3 and executed by the CPU 2-2. In other words, the CPU can execute the 2-byte instruction of the second type of software in the emulation mode.

In this embodiment, the third field controlled by the byte designating signal is positioned at the LSB field to make manipulation of the 2-byte instruction in the first type of software easy. That is the access of the second byte of the 2-byte instruction in the first type of software can be performed by merely changing the bit of LSB from "0" to "1". In other words, in this operation modification of the first and the second fields are not required and the address control can be simplified. If the number of bits of the third field is increased. instructions of more than two bytes can be accessed in the same way.

Further, the first field is used to allow the access of the 2-byte instruction in the second type of software. Namely, by changing pages in the conversion memory 2-3 with respect to the instructions each of which has a different number of bytes, the accesses for any number of bytes can be performed. Therefore, if the number of bits in the first field is increased, any instructions consisting of more than two bytes can be easily converted into instructions which can be directly executed by the CPU 2-2.

Figure 5:
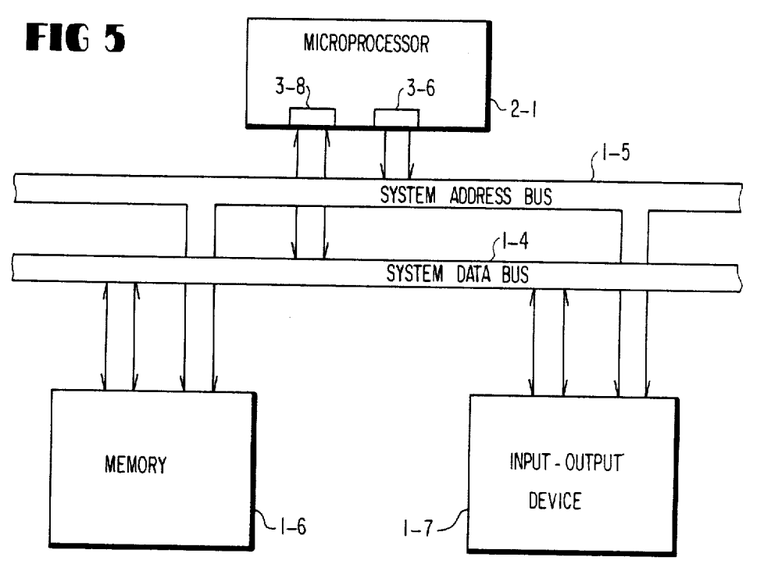
FIG. 5 is a system block diagram of a microprocessor system using the microprocessor of the present invention

FIG. 5 is a system block diagram of an example of a processing system in which the microprocessor is employed. The address bus terminals 2-6 and the data bus terminals 2-8 of the microprocessor 2-1 in FIG. 1 are coupled to the system address bus 1-5 and the system data bus 1-4, respectively. These system buses 1-4 and 1-5 are further coupled to the external memory 1-6 and the input-output device 1-7. The external memory 1-6 includes the first type of software and the second type of software. The microprocessor 2-1 can execute the first type of software in the native mode and also execute the second type of software in the emulation mode as described below.

In the native mode, the emulation control circuit 2-15 sends a first control signal on line 2-18 indicating that the instruction decoder 2-10 is to be coupled to the internal data bus 2-7 through the selector 2-9. A flip-flop can be used as the emulation control circuit 2-15 and is set or reset for the native mode. If the "reset" is used for the native mode, a "0" level signal is applied to the selector 2-9 as the first control signal. Under this condition, the content of the program counter 2-14 is transferred to the external memory 1-6 via the address bus terminals 2-6 and the system address bus 1-5 for reading an instruction in the first type of software out of the external memory 1-6. The accessed instruction is transferred to the internal data bus 2-7 via the system data bus 1-4 and the data bus terminals 2-8, and is directly applied to the instruction decoder 2-10 through the selector 2-9. The decoder 2-10 decodes the instruction and generates a plurality of control signals including an increment signal applied to the program counter 2-14 according to a timing signal which is produced by the timing control circuits 2-11. The program counter 2-14 is incremented according to the incrementing signal. The CPU 2-2 executes an operation according to the control signals. When the execution is terminated, the content of the program counter 2-14 is outputted from the address bus terminals in response to a timing signal indicating an instruction fetch operation. Thus, the first type of software is executed without use of the conversion memory 2-3 in the native mode. In this mode, the instruction to be executed by the CPU 2-2 can be directly decoded by the instruction decoder 2-10.

On the other hand, in the emulation mode an instruction read out of the external memory 1-6 is one of the second types of software which cannot be directly executed by the CPU. In order to switch over from the native mode into the emulation mode, the native mode should include such a last instruction that indicates a need to change in the state of the flip-flop of the emulation control circuit 2-15. Thus, if the flip-flop is in the reset state in the native mode. it is set at "1." before the instructions of the emulation mode are applied to the data bus terminals 2-8. The "1" level signal is applied to the selector 2-9 as a second control signal indicating that the instruction decoder 2-10 is to be coupled to the conversion memory 2-3. The set operation of the flip-flop may be controlled by an output of the decoder 2-10 which is generated on the basis of a mode designating instruction included in the first type of software, or in response to a mode designating switch.

The access of the external memory 1-6 is the same as in the native mode. An accessed instruction in the second type of software is transferred to the internal data bus 2-7 via the system data bus 1-4 and the data bus terminals 2-8. Then the instruction is applied to the conversion memory 2-3 as an address. Thus, the instruction converted into one which can be directly executed by the CPU is applied to the instruction decode 2-10 as described above. At this moment the address control circuit 2-4 operates as described above.

The last instruction of the emulation mode should include an indication to change the state of the flip-flop of the emulation control circuit 2-15, if the first type of the software is to be executed after the execution of the second type of the software.

The initial state of the flip-flop of the emulation control circuit 2-15 may be determined to be predetermined state from either the native mode or emulation mode by. for example, a power-on reset signal (not shown) provided within the processor 2-1. Thus, the instructions of the predetermined initial mode (native or emulation) should be first applied to the processor 2-1. Alternatively, the state of the flip-flop of the emulation control circuit 2-15 may be controlled externally, by providing the emulation control circuit 2-15 outside the processor 2-1 or by providing the processor 2-1 with a control terminal coupled to the emulation control circuit 2-15. In this case, either type of the software can be first supplied to the processor 2-1 by determining the state of the emulation control circuit 2-15 to be adapted for that type of the software.

According to the present invention, both the native mode and the emulation mode can be performed easily and at a high speed by the same CPU. Here, a high-speed instruction conversion can be performed by providing the conversion memory and the address control circuit on the same semiconductor chip as that on which the CPU is formed. However, the conversion memory and the address control circuit may be provided outside of the CPU chip.

What is claimed:

1. A microprocessor including a central processing unit capable of executing only instructions of a first type having a first bit length but incapable of executing instructions of a second type having a second bit length different from said first bit length which is different from said type, said central processing unit having an instruction decoder for decoding only the instructions of the first type, said microprocessor further comprising:

receiving means for receiving an instruction of one of said first and second types which is indicative of a predetermined operation;

means for directly transferring the instruction indicative of said predetermined operation received by said receiving means only when said received instruction is of said first type;

conversion memory means provided outside said central processing unit for converting the received instruction of said second type indicative of said predetermined operation into an instruction of said first type indicative of said predetermined operation, said conversion memory means including storing means for storing instructions of said first type and applying means for applying at least a part of said instruction of said second type received by said receiving means to said storing means as an address for said storing means to thereby read out of said storing means at least one instruction of said first type indicative of said predetermined function; and means provided outside said central processing unit for transferring the read-out instruction of said first type to said instruction decoder when the instruction received by said receiving means is of said second type, whereby the instruction of said second type indicative of a predetermined operation is converted to an instruction of said first type indicative of said predetermined operation through said conversion memory means and said central processing unit thereafter performs said predetermined operation.

2. A microprocessor as claimed in claim 1, in which said applying means includes means for generating an address portion for designating a further first type instruction to be read out of said storing means subsequent to said at least one instruction.

3. A microprocessor as claimed in claim 2, in which said generating means generates said address portion according to a content of said at least one first type instruction.

4. A microprocessor as claimed in claim 1, in which said applying means applies two addresses to said storing means when the at least one first type instruction corresponding to the received second type instruction consists of two bytes.

5. A microprocessor as claimed in claim 1, in which said storing means stores a specific information indicating that the received second type instruction consists of a plurality of bytes.

6. A microprocessor as claimed in claim 5, in which said specific information is read out of said storing means according to a first byte of the received second type instruction.

7. A microprocessor comprising a central processing unit which can execute instructions of a first bit length but cannot execute instructions of a second bit length different from said first bit length, said central processing unit including an instructions decoder for decoding the instructions of said first bit length, said instruction decoder being unable to decode the instruction of said second bit length, means for receiving an instruction of one of said first bit length and said second bit length which is indicative of a predetermined operation, means for directly transferring the instruction received by said receiving means to said instruction decoder only when said received instruction is of said first bit length, a conversion memory provided outside said central processing unit and having an input port and an output port and storing instructions of said first bit length, means for operatively applying at least part of the instruction of said second bit length received by said receiving means to the input port of said conversion memory to thereby produce at the output port of said conversion memory the instruction of said first bit length indicative of said predetermined operation, and means for transferring the instruction of said first bit length produced at the output port of said conversion memory to said instruction decoder only when the instruction received by said receiving means is of said second bit length.

8. A microprocessor as claimed in claim 7, in which said first bit length is longer than said second bit length.

9. A microprocessor comprising:
a central processing unit having an instruction decoder generating at least one control signal by decoding an instruction of a first type, said instruction decoder being unable to decode an instruction of a second type different from said first type, and an execution means executing a program according to the control signal generated from said instruction decoder,
a data bus receiving an instruction of one of said first and second types from the outside of said microprocessor,
a conversion memory provided outside said central processing unit and having an input port and an output port, said conversion memory storing instructions of said first type and producing one of the instructions stored therein at its output port in accordance with a state of the input port thereof,
address control means coupled to said data bus and the input port of said conversion memory,
a selector having a first input port coupled to said data bus and a second input port coupled to said output port of said conversion memory and having an output port, said selector operatively transferring data at the first input port thereof to its output port without changing data at said first input port in a first mode and transferring data at its second input port to its output port in a second mode,
a control circuit coupled to said selector for setting said selector in said first mode when the instruction received at said data bus is of said first type and in said second mode when the instruction received at said data bus is of said second type, and
means for applying information at the output port of said selector to said instruction decoder,
whereby the instruction of said second type indicative of a predetermined operation is converted into the instruction of said first type indicative of said predetermined operation through said conversion memory and the converted instruction of said first type is applied to said instruction decoder.

10. A microprocessor as claimed in claim 9, in which the instruction of said first type is composed of a first bit-length data and the instruction of said second type is composed of a second bit-length data shorter than said first bit-length.

* * * * *